(12) United States Patent
Padua et al.

(10) Patent No.: US 8,220,705 B2
(45) Date of Patent: Jul. 17, 2012

(54) SYSTEM AND METHOD FOR CARD BASED DOCUMENT PROCESSING DEVICE LOGIN AND ACCOUNTING

(75) Inventors: Manjunathan Y. Padua, Malleswaram (West) (IN); Manmohan Garg, Bellevue, WA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/504,081

(22) Filed: Jul. 16, 2009

(65) Prior Publication Data

US 2011/0011929 A1 Jan. 20, 2011

(51) Int. Cl.
G06F 17/00 (2006.01)
G06F 7/00 (2006.01)
G06F 19/00 (2006.01)
G06F 3/12 (2006.01)
G06K 5/00 (2006.01)
G06K 19/00 (2006.01)
G06K 15/00 (2006.01)
G06G 7/00 (2006.01)

(52) U.S. Cl. ........ 235/375; 235/380; 235/376; 235/385; 235/487; 358/1.13; 705/400; 705/408

(58) Field of Classification Search ........ 358/1.13–1.15; 235/375, 487, 385, 380, 376; 705/400, 408, 705/14.37, 20
See application file for complete search history.

(56) References Cited

U.S. PATENT DOCUMENTS

| | | | |
|---|---|---|---|
| 6,199,055 B1 * | 3/2001 | Kara et al. | 705/405 |
| 7,004,385 B1 * | 2/2006 | Douglass | 235/379 |
| 7,038,801 B2 * | 5/2006 | Kurozasa et al. | 358/1.15 |
| 7,124,094 B1 * | 10/2006 | Kobayashi et al. | 705/64 |
| 7,154,630 B1 * | 12/2006 | Nimura et al. | 358/1.18 |
| 7,170,618 B2 * | 1/2007 | Fujitani et al. | 358/1.15 |
| 7,516,882 B2 * | 4/2009 | Cucinotta | 235/379 |
| 7,576,883 B2 * | 8/2009 | Ragnet et al. | 358/1.15 |
| 7,614,557 B2 * | 11/2009 | Watanabe | 235/454 |
| 2001/0014881 A1 * | 8/2001 | Drummond et al. | 705/43 |
| 2002/0013771 A1 * | 1/2002 | Blackson et al. | 705/43 |
| 2002/0036796 A1 * | 3/2002 | Kurozasa et al. | 358/1.15 |
| 2002/0082994 A1 * | 6/2002 | Herziger | 705/43 |
| 2002/0139842 A1 * | 10/2002 | Swaine | 235/379 |
| 2002/0161864 A1 * | 10/2002 | Kyoya | 709/220 |
| 2003/0048471 A1 * | 3/2003 | Lundgren | 358/1.15 |
| 2003/0084303 A1 * | 5/2003 | Neubauer | 713/185 |
| 2003/0193689 A1 * | 10/2003 | Nakagawa | 358/1.15 |
| 2003/0209599 A1 * | 11/2003 | Gatto | 235/379 |
| 2003/0220712 A1 * | 11/2003 | Butikofer | 700/235 |
| 2004/0021889 A1 * | 2/2004 | McAfee et al. | 358/1.13 |

(Continued)

*Primary Examiner* — Daniel Walsh
(74) *Attorney, Agent, or Firm* — SoCal IP Law Group LLP; Steven C. Sereboff; Jonathan Pearce (57) ABSTRACT

The subject application is directed to a system and method for automated document processing device login and accounting. Identification data corresponding to an identity of an associated user and accounting data corresponding to each of a plurality of billing accounts is communicated with an associated portable data storage. Data corresponding to each of the plurality of billing accounts is displayed, and selection data is received corresponding to at least one billing account corresponding to the plurality of billing accounts associated with the display of data. An associated document processing device is enabled in accordance with selection data and identification data received from the portable data storage. Usage of the document processing device is monitored relative to received selection data, and usage data corresponding to monitored usage of the document processing device with associated billing account data is communicated to an associated administrator.

16 Claims, 9 Drawing Sheets

U.S. PATENT DOCUMENTS

| | | | |
|---|---|---|---|
| 2004/0032624 A1* | 2/2004 | Stevens et al. | 358/402 |
| 2004/0233474 A1* | 11/2004 | Watanabe | 358/1.15 |
| 2005/0078332 A1* | 4/2005 | Brown | 358/1.14 |
| 2005/0114215 A1* | 5/2005 | Tramontano et al. | 705/16 |
| 2005/0121513 A1* | 6/2005 | Drummond et al. | 235/381 |
| 2005/0151992 A1* | 7/2005 | Shaw et al. | 358/1.14 |
| 2005/0174594 A1* | 8/2005 | Cherry et al. | 358/1.14 |
| 2005/0264844 A1* | 12/2005 | Fujitani et al. | 358/1.15 |
| 2006/0023248 A1* | 2/2006 | Reese et al. | 358/1.15 |
| 2006/0082807 A1* | 4/2006 | Tanaka et al. | 358/1.15 |
| 2007/0035762 A1* | 2/2007 | Wilsher et al. | 358/1.14 |
| 2007/0035763 A1* | 2/2007 | Bard et al. | 358/1.15 |
| 2007/0084911 A1* | 4/2007 | Crowell | 235/379 |
| 2007/0181674 A1* | 8/2007 | Taylor et al. | 235/381 |
| 2007/0182984 A1* | 8/2007 | Ragnet et al. | 358/1.15 |
| 2009/0033990 A1* | 2/2009 | Matsugashita | 358/1.15 |
| 2009/0134215 A1* | 5/2009 | Drummond et al. | 235/379 |
| 2009/0144162 A1* | 6/2009 | Milne | 705/17 |
| 2009/0262381 A1* | 10/2009 | Tsujimoto | 358/1.14 |
| 2011/0026065 A1* | 2/2011 | Bard et al. | 358/1.14 |

* cited by examiner

SYSTEM AND METHOD FOR CARD BASED DOCUMENT PROCESSING DEVICE LOGIN AND ACCOUNTING

BACKGROUND OF THE INVENTION

The subject application is directed generally to control of document processing device operation. The application is particularly suited to monitoring and controlling device usage relative to each of a plurality of users.

Document processing devices in widespread use include copiers, printers, facsimile machines, electronic mail devices, and scanners. More recently, two or more of such functions are found on a single device referred to as a multifunction peripheral (MFP) or multifunction device (MFD). Due to the cost of obtaining and maintaining sophisticated document processing devices, most enterprises will share devices between a large number of users. Often costs for operation of a device must be accounted for prior to device operation. This allows for costs to be allocated to individuals or departments or for billing back to clients.

Conventional office environments will include an interface on a document processing device, wherein a user must log in and supply a billing code before the device is enabled. It is time-consuming for each user to login to a device, recall, and then enter the appropriate billing code. This process results in longer queues to use a device and wasted time for users and is subject to erroneous code entry.

SUMMARY OF THE INVENTION

In accordance with one embodiment of the subject application, there is provided a system and method for automated document processing device login and accounting. Identification data corresponding to an identity of an associated user and accounting data corresponding to each of a plurality of billing accounts is communicated with an associated portable data storage. Data corresponding to each of the plurality of billing accounts is displayed, and selection data is received corresponding to at least one billing account corresponding to the plurality of billing accounts associated with the display of data. An associated document processing device is enabled in accordance with selection data and identification data received from the portable data storage. Usage of the document processing device is monitored relative to received selection data, and usage data corresponding to monitored usage of the document processing device with associated billing account data is communicated to an associated administrator.

Still other advantages, aspects, and features of the subject application will become readily apparent to those skilled in the art from the following description, wherein there is shown and described a preferred embodiment of the subject application, simply by way of illustration of one of the modes best suited to carry out the subject application. As it will be realized, the subject application is capable of other different embodiments, and its several details are capable of modifications in various obvious aspects, all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for controlling operations of a document processing device. In particular, the subject application is directed to a system and method for monitoring and controlling device usage relative to each of a plurality of users. It will become apparent to those skilled in the art that the system and method described herein are suitably adapted to a plurality of varying electronic fields employing usage controls including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
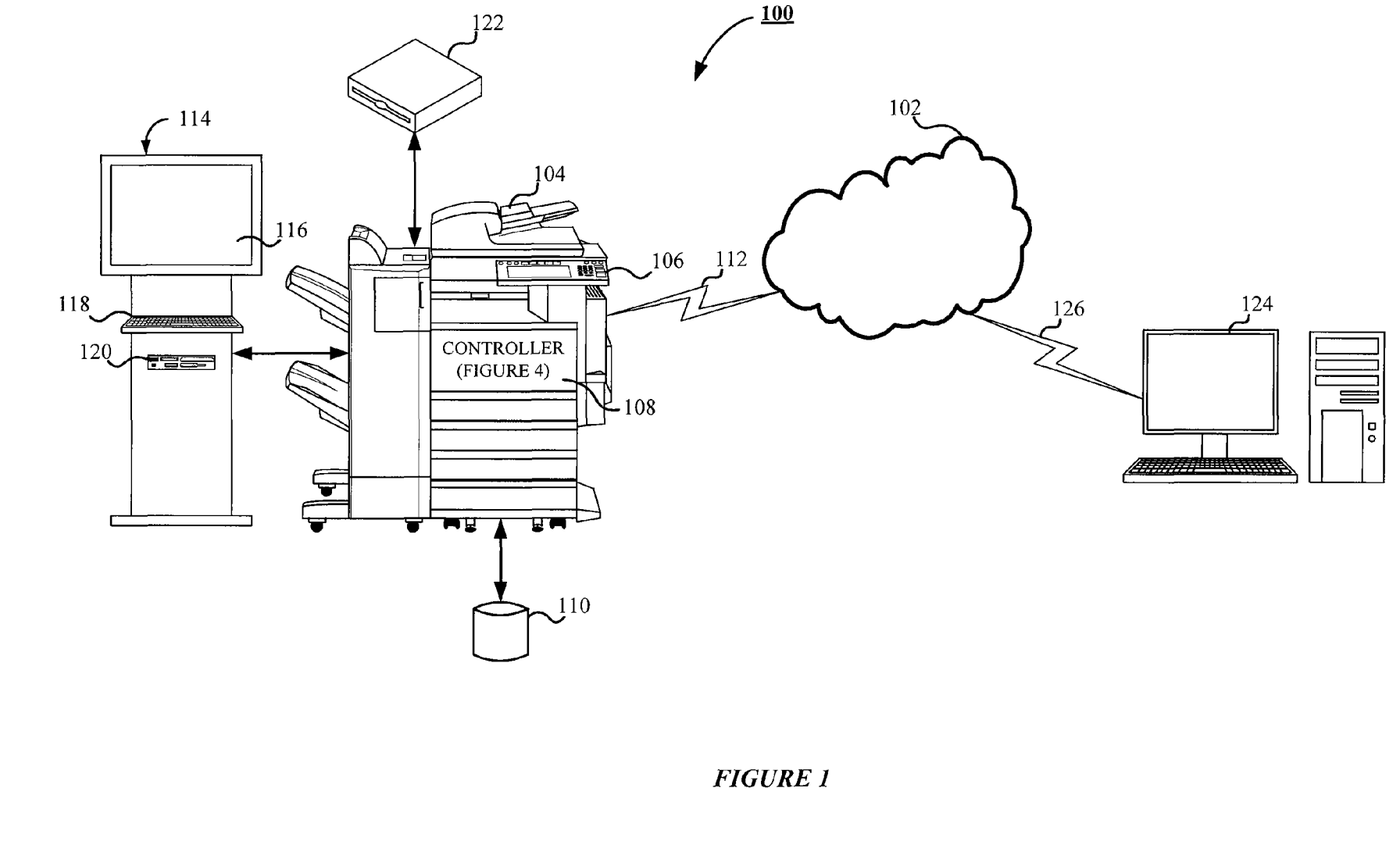
FIG. 1 is an overall diagram of a document processing device usage and accounting system according to one embodiment of the subject application.

Referring now to FIG. 1, there is shown an overall diagram of a system 100 for document processing device usage and accounting in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art that is capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad conventional data transport mechanisms such as, for example and without limitation, Token-Ring, 802.11(x), Ethernet, or other wireless or wire-based data communication mechanisms. The skilled artisan will appreciate that, while a computer network 102 is shown in FIG. 1, the subject application is equally capable of use in a stand-alone system, as will be known in the art.

The system 100 also includes a document processing device 104, which is depicted in FIG. 1 as a multifunction peripheral device suitably adapted to perform a variety of document rendering or processing operations. It will be appreciated by those skilled in the art that such document rendering operations include, for example and without limitation, facsimile, scanning, copying, printing, electronic mail, document management, document storage, or the like. Suitable commercially-available document processing devices include, for example and without limitation, the Toshiba e-Studio Series Controller. In accordance with one aspect of the subject application, the document processing device 104 is suitably adapted to provide remote document rendering or processing services to external or network devices. Preferably, the document processing device 104 includes hardware, software, or any suitable combination thereof configured to interact with an associated user, a networked device, or the like.

According to one embodiment of the subject application, the document processing device 104 is suitably equipped to receive a plurality of portable storage media including, without limitation, Firewire drive, USB drive, SD, MMC, XD, compact flash, memory stick, and the like. In the preferred embodiment of the subject application, the document processing device 104 further includes an associated user interface 106 such as a touch screen, LCD display, touch-panel, alpha-numeric keypad, or the like via which an associated user is able to interact directly with the document processing device 104. In accordance with the preferred embodiment of the subject application, the user interface 106 is advantageously used to communicate information to the associated user and to receive selections from the associated user. The skilled artisan will appreciate that the user interface 106 comprises various components suitably adapted to present data to the associated user, as are known in the art. In accordance with one embodiment of the subject application, the user interface 106 comprises a display suitably adapted to display one or more graphical elements, text data, images, or the like to an associated user; to receive input from the associated user; and to communicate the same to a backend component such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof configured to control the operations of the associated document processing device 104, to facilitate the display of images via the user interface 106, to direct the manipulation of electronic image data, and the like. For purposes of explanation, the controller 108 is used to refer to any of the myriad components associated with the document processing device 104, including hardware, software, or combinations thereof functioning to perform, cause to be performed, control, or otherwise direct the methodologies described hereinafter. It will be understood by those skilled in the art that the methodologies described with respect to the controller 108 are capable of being performed by any general purpose computing system known in the art, and thus the controller 108 is representative of such general computing devices and is intended as such when used hereinafter. Furthermore, the use of the controller 108 hereinafter is for the example embodiment only, and other embodiments that will be apparent to one skilled in the art are capable of employing the system and method for document processing device usage and accounting. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, cellular telephone data, pre-set payment data, document data, image data, electronic database data, or the like. It will be appreciated by those skilled in the art that, while illustrated in FIG. 1 as being a separate component of the system 100, the data storage device 110 is capable of being implemented as an internal storage component of the document processing device 104, a component of the controller 108, or the like such as, for example and without limitation, an internal hard disk drive or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

FIG. 1 also illustrates a kiosk 114 communicatively coupled to the document processing device 104 and, in effect, to the computer network 102. It will be appreciated by those skilled in the art that the kiosk 114 is capable of being implemented as a separate component of the document processing device 104 or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116 and a user input device 118. As will be understood by those skilled in the art, the kiosk 114 is capable of implementing a combination user input device/display, such as a touch screen interface. According to one embodiment of the subject application, the kiosk 114 is suitably adapted to display prompts to an associated user, to receive document processing instructions from the associated user, to receive payment data, to receive selection data from the associated user, and the like. Preferably, the kiosk 114 includes a magnetic card reader, conventional bar code reader, or the like suitably adapted to receive and read payment data from a credit card, coupon, debit card, or the like.

The system 100 of FIG. 1 also includes a portable storage device reader 120 coupled to the kiosk 114 that is suitably adapted to receive and access myriad different portable storage devices. Examples of such portable storage devices include, for example and without limitation, flash-based memory such as SD, xD, memory stick, compact flash, CD-ROM, DVD-ROM, USB flash drives, or other magnetic or optical storage devices, as will be known in the art.

Also illustrated in FIG. 1 is a portable storage device 122 that is capable of data communication with the document processing device 104. As will be appreciated by those skilled in the art, suitable portable storage devices include, for example and without limitation, radio frequency identification (RFID) card, smart card, magnetic storage card, employee badge, flash drive, or the like. The skilled artisan will appreciate that other suitable portable storage devices are equally capable of implementation in accordance with the subject application. In accordance with one example embodiment of the subject application, the portable storage device 122 includes, for example and without limitation, user identification data, billing account data, accounting data, client data, matter data, patient data, customer data, usage information data, and the like.

Depicted in FIG. 1 is an administrative device 124, illustrated as a personal computer in data communication with the computer network 102 via a communications link 126. It will be appreciated by those skilled in the art that the administrative device 124 is shown in FIG. 1 as a workstation computer for illustration purposes only. As will be understood by those skilled in the art, the administrative device 124 is representative of any personal computing device known in the art including, for example and without limitation, a laptop computer, a personal computer, a personal data assistant, a web-enabled cellular telephone, a smart phone, a proprietary network device, or other web-enabled electronic device. The communications link 126 is any suitable channel of data communications known in the art including but not limited to wireless communications, for example and without limitation, Bluetooth, WiMax, 802.11a, 802.11b, 802.11g, 802.11 (x), a proprietary communications network, infrared, optical, the public switched telephone network, or any suitable wireless data transmission system or wired communications known in the art. According to one embodiment of the subject application, the administrative device 124 further includes a suitable accounting system configured to monitor, track, and bill operations of the associated document processing device 104. In accordance with a further embodiment of the subject application, the administrative device 124 is capable of providing document data, user interface data, and/or image data; monitoring document processing jobs, user accounts, and/or billing information; employing thin-client interfaces; generating display data or output data; or the like with respect to the document processing device 104 or any other similar device coupled to the computer network 102.

Figure 2:
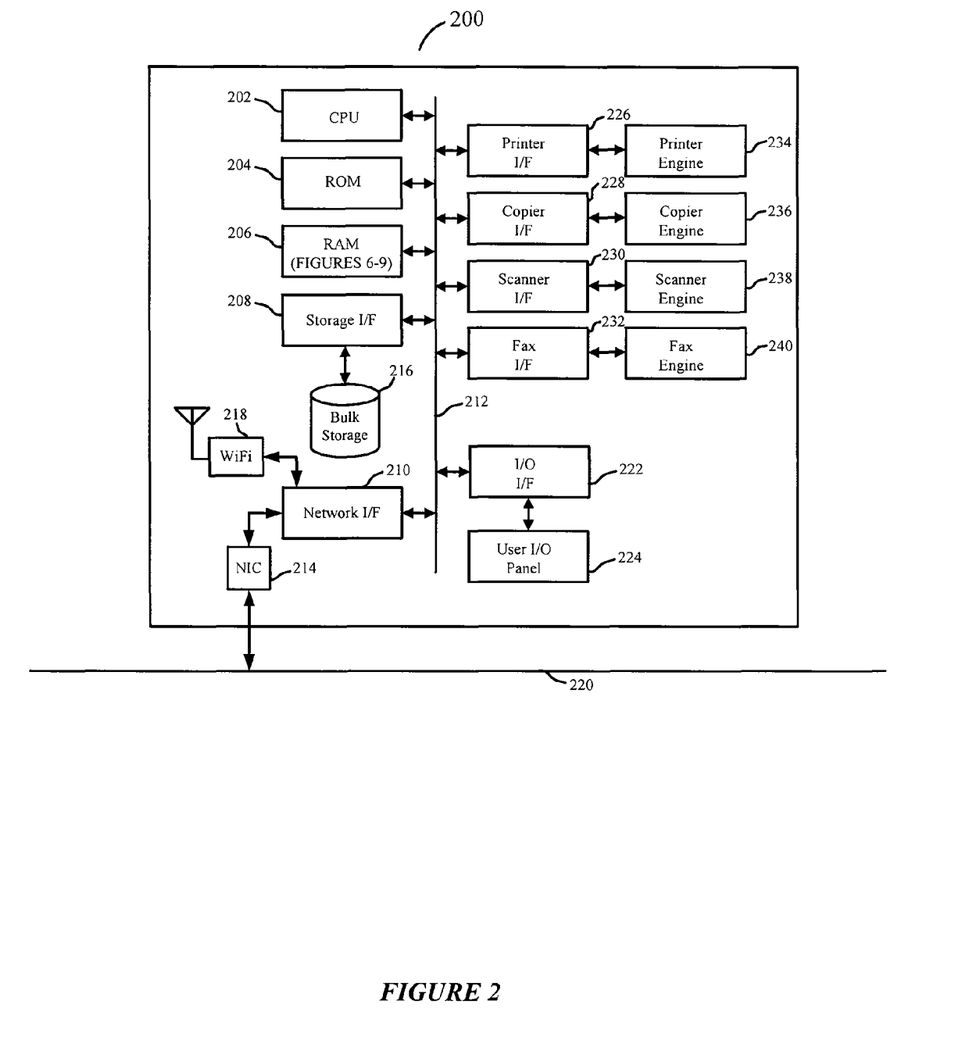
FIG. 2 is a block diagram illustrating device hardware for use in the document processing device usage and accounting system according to one embodiment of the subject application.

Turning now to FIG. 2, illustrated is a representative architecture of a suitable device 200, shown in FIG. 1 as the document processing device 104, on which operations of the subject system are completed. Included is a processor 202 suitably comprised of a central processor unit. However, it will be appreciated that the processor 202 may be advantageously composed of multiple processors working in concert with one another, as will be appreciated by one of ordinary skill in the art. Also included is a non-volatile or read only memory 204, which is advantageously used for static or fixed data or instructions such as BIOS functions, system functions, system configuration data, and other routines or data used for operation of the device 200.

Also included in the device 200 is random access memory 206 suitably formed of dynamic random access memory, static random access memory, or any other suitable addressable memory system. Random access memory 206 provides a storage area for data instructions associated with applications and data handling accomplished by the processor 202.

A storage interface 208 suitably provides a mechanism for volatile, bulk, or long-term storage of data associated with the device 200. The storage interface 208 suitably uses bulk storage, such as any suitable addressable or serial storage such as a disk, optical, tape drive, and the like as shown as 216, as well as any suitable storage medium, as will be appreciated by one of ordinary skill in the art.

A network interface subsystem 210 suitably routes input and output from an associated network, allowing the device 200 to communicate to other devices. The network interface subsystem 210 suitably interfaces with one or more connections with external devices to the device 200. By way of example, illustrated is at least one network interface card 214 for data communication with fixed or wired networks such as Ethernet, Token-Ring, and the like and a wireless interface 218 suitably adapted for wireless communication via means such as WiFi, WiMax, wireless modem, cellular network, or any suitable wireless communication system. It is to be appreciated, however, that the network interface subsystem 210 suitably utilizes any physical or non-physical data transfer layer or protocol layer, as will be appreciated by one of ordinary skill in the art. In the illustration, the network interface card 214 is interconnected for data interchange via a physical network 220 suitably comprised of a local area network, wide area network, or a combination thereof.

Data communication between the processor 202, read only memory 204, random access memory 206, storage interface 208, and the network subsystem 210 is suitably accomplished via a bus data transfer mechanism, such as illustrated by the bus 212.

Suitable executable instructions on the device 200 facilitate communication with a plurality of external devices such as workstations, document processing devices, other servers, or the like. While, in operation, a typical device operates autonomously, it is to be appreciated that direct control by a local user is sometimes desirable and is suitably accomplished via an optional input/output interface 222 to a user input/output panel 224, as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
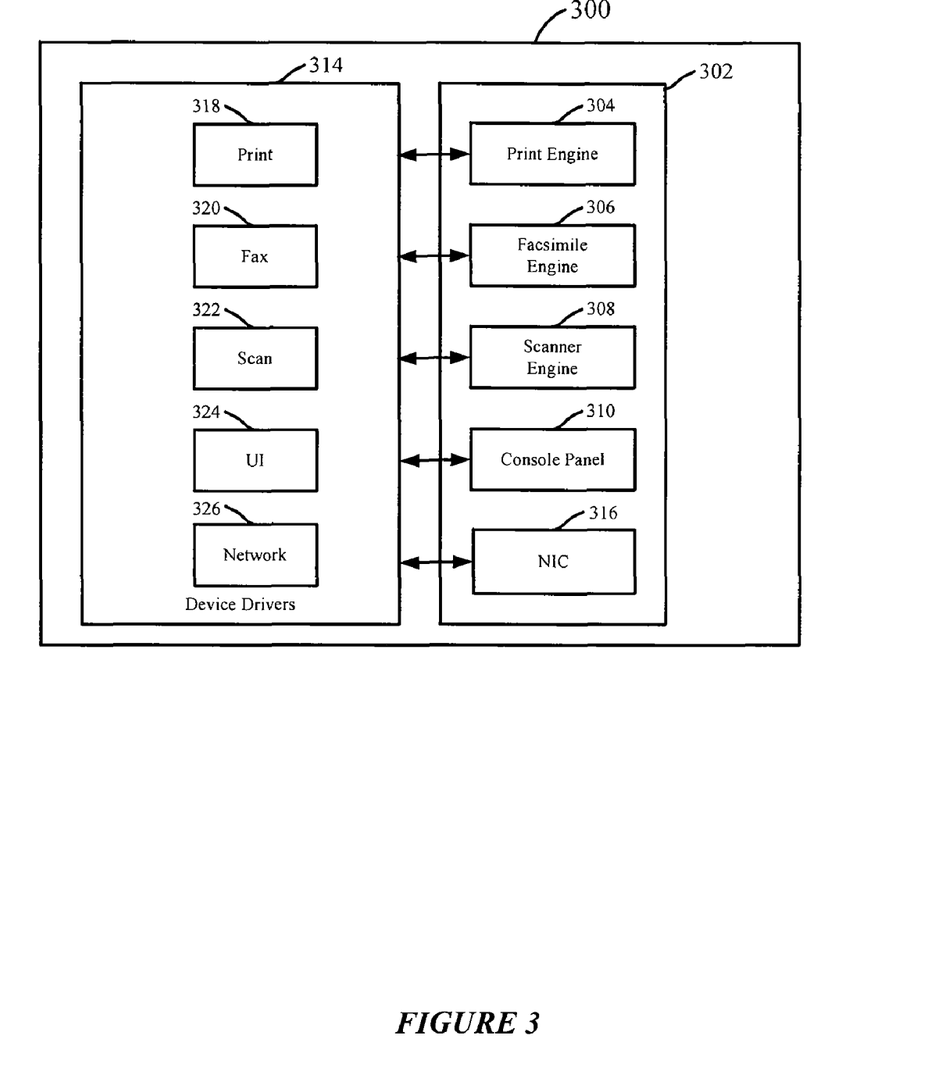
FIG. 3 is a functional diagram illustrating the device for use in the document processing device usage and accounting system according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality, as will be appreciated by one of ordinary skill in the art. The document processing device 300 suitably includes an engine 302 that facilitates one or more document processing operations.

The document processing engine 302 suitably includes a print engine 304, facsimile engine 306, scanner engine 308, and console panel 310. The print engine 304 allows for output of physical documents representative of an electronic document communicated to the processing device 300. The facsimile engine 306 suitably communicates to or from external facsimile devices via a device such as a fax modem.

The scanner engine 308 suitably functions to receive hard copy documents and, in turn, image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format and is also suitably configured for optical character recognition. Tangible document scanning also suitably functions to facilitate facsimile output thereof.

In the illustration of FIG. 3, the document processing engine also comprises an interface 316 with a network via driver 326 suitably comprised of a network interface card. It will be appreciated that a network thoroughly accomplishes that interchange via any suitable physical and non-physical layer such as wired, wireless, or optical data communication.

The document processing engine 302 is suitably in data communication with one or more device drivers 314, which device drivers 314 allow for data interchange from the document processing engine 302 to one or more physical devices to accomplish the actual document processing operations. Such document processing operations include one or more of printing via driver 318, facsimile communication via driver 320, scanning via driver 322, and user interface functions via driver 324. It will be appreciated that these various devices are integrated with one or more corresponding engines associated with the document processing engine 302. It is to be appreciated that any set or subset of document processing operations are contemplated herein. Document processors that include a plurality of available document processing options are referred to as multi-function peripherals.

Figure 4:
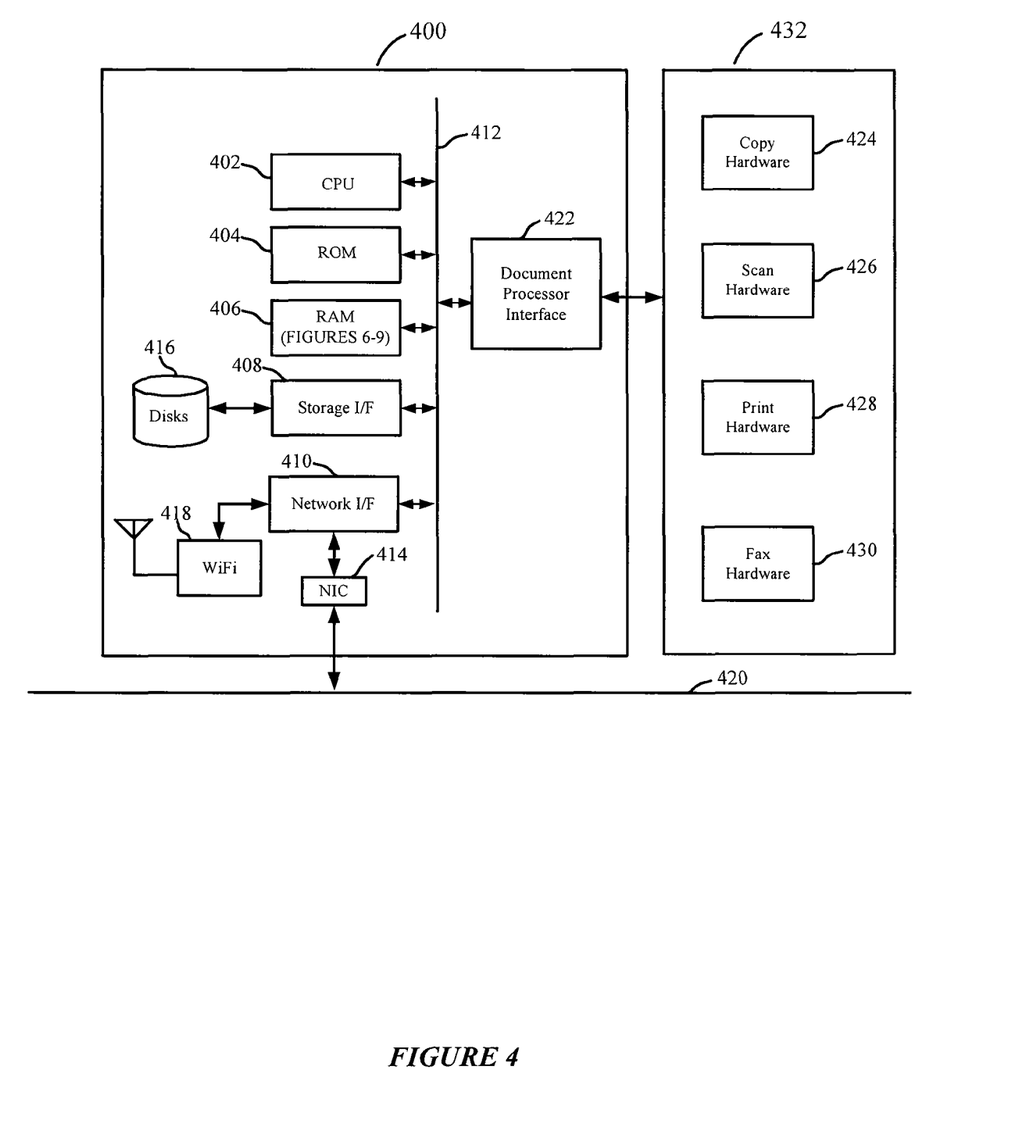
FIG. 4 is a block diagram illustrating controller hardware for use in the document processing device usage and accounting system according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device known in the art that is capable of facilitating the methodologies described herein. Included is a processor 402 suitably comprised of a central processor unit. However, it will be appreciated that processor 402 may be advantageously composed of multiple processors working in concert with one another, as will be appreciated by one of ordinary skill in the art. Also included is a non-volatile or read only memory 404, which is advantageously used for static or fixed data or instructions such as BIOS functions, system functions, system configuration data, and other routines or data used for operation of the controller 400.

Also included in the controller 400 is random access memory 406 suitably formed of dynamic random access memory, static random access memory, or any other suitable addressable and writable memory system. Random access memory 406 provides a storage area for data instructions associated with applications and data handling accomplished by processor 402.

A storage interface 408 suitably provides a mechanism for non-volatile, bulk, or long-term storage of data associated with the controller 400. The storage interface 408 suitably uses bulk storage, such as any suitable addressable or serial storage such as a disk, optical, tape drive, and the like as shown as 416, as well as any suitable storage medium, as will be appreciated by one of ordinary skill in the art.

A network interface subsystem 410 suitably routes input and output from an associated network, allowing the controller 400 to communicate to other devices. The network interface subsystem 410 suitably interfaces with one or more connections with external devices to the device 400. By way of example, illustrated is at least one network interface card 414 for data communication with fixed or wired networks such as Ethernet, Token-Ring, and the like and a wireless interface 418 suitably adapted for wireless communication via means such as WiFi, WiMax, wireless modem, cellular network, or any suitable wireless communication system. It is to be appreciated, however, that the network interface subsystem 410 suitably utilizes any physical or non-physical data transfer layer or protocol layer, as will be appreciated by one of ordinary skill in the art. In the illustration, the network interface 414 is interconnected for data interchange via a physical network 420 suitably comprised of a local area network, wide area network, or a combination thereof.

Data communication between the processor 402, read only memory 404, random access memory 406, storage interface 408, and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
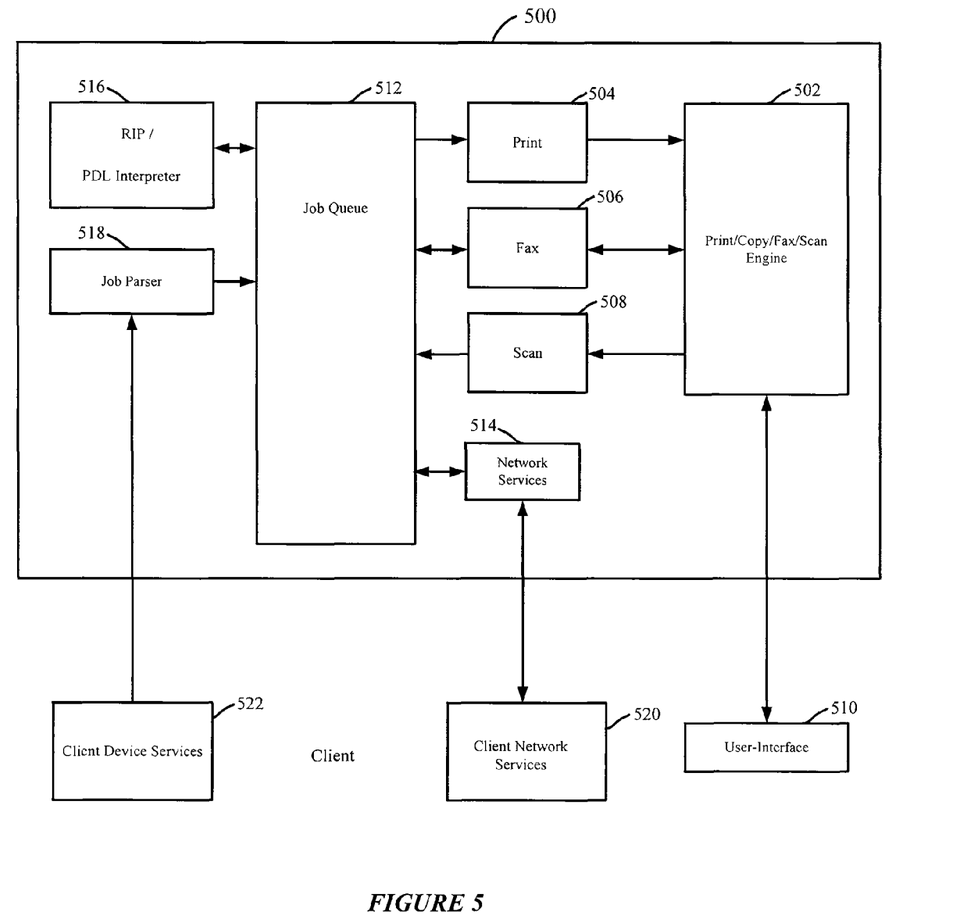
FIG. 5 is a functional diagram illustrating the controller for use in the document processing device usage and accounting system according to one embodiment of the subject application.

Functionality of the subject system 100 is accomplished on a suitable document processing device, such as the document processing device 104, which includes the controller 400 of FIG. 4 (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality, as will be appreciated by one of ordinary skill in the art.

In the preferred embodiment, the engine 502 allows for printing operations, copy operations, facsimile operations, and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited-purpose document processing devices that perform one or more of the document processing operations listed above.

The engine 502 is suitably interfaced to a user interface panel 510, which panel 510 allows for a user or administrator to access functionality controlled by the engine 502. Access is suitably enabled via an interface local to the controller or remotely via a remote thin or thick client.

The engine 502 is in data communication with the print function 504, facsimile function 506, and scan function 508. These functions 504, 506, 508 facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and network services 514. Thus, suitable interface is provided for network-based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supply data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser 518 suitably functions to receive print job language files from an external device such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the 1o afore-described functionality and components.

Figure 6:
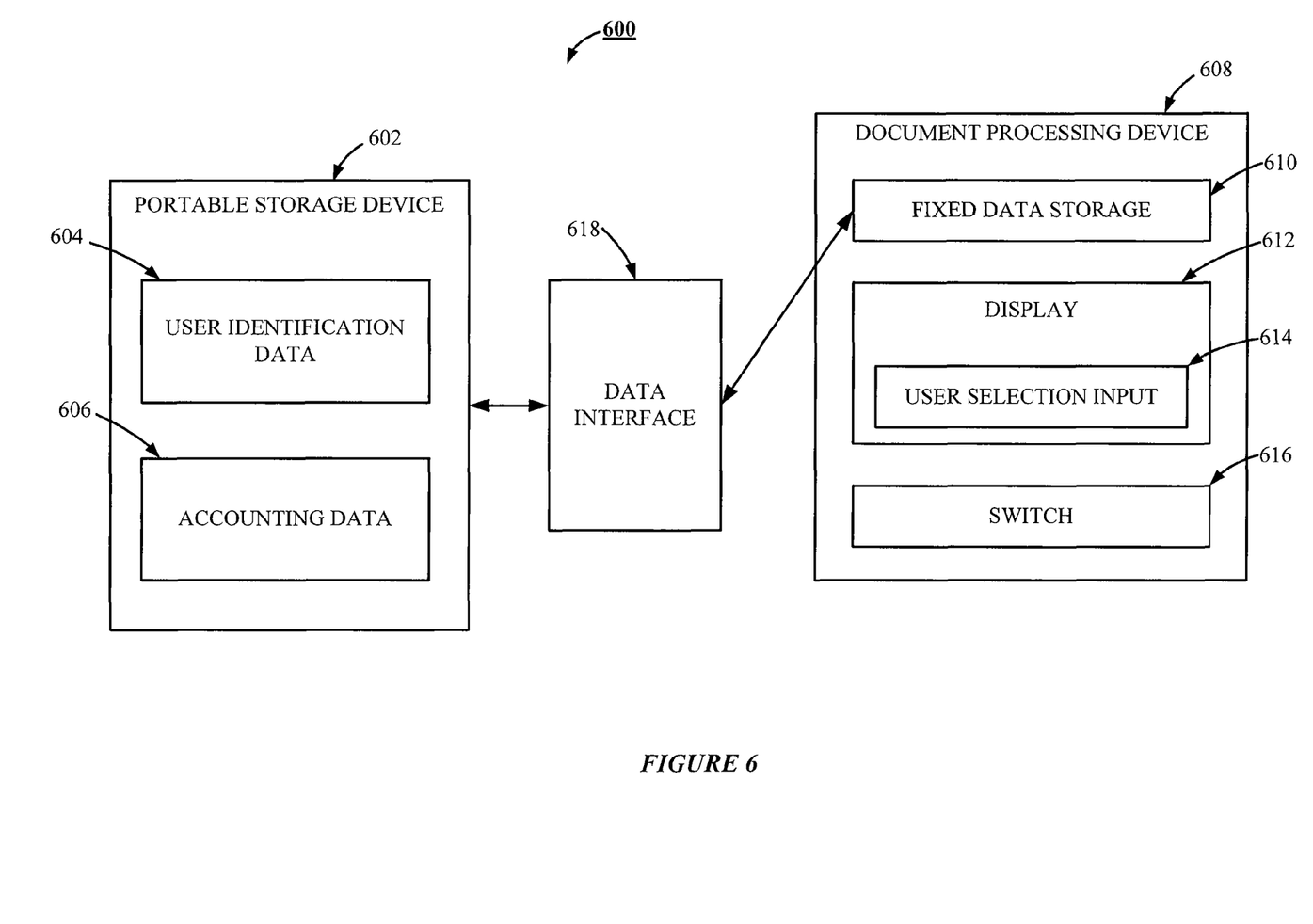
FIG. 6 is a block diagram illustrating the document processing device usage and accounting system according to one embodiment of the subject application.

Turning now to FIG. 6, illustrated is a block diagram of a system 600 for document processing device usage and accounting in accordance with one embodiment of the subject application. The system 600 includes a portable storage device 602 that stores user identification data 604 and accounting data 606. According to one embodiment of the subject application, the accounting data includes, for example and without limitation, data corresponding to each of a plurality of billing accounts. The system 600 further includes a document processing device 608 configured with an associated fixed data storage 610, a display 612, user selection input 614, and a switch 616. Preferably, the portable storage device 602 and the fixed data storage 610 associated with the document processing device 608 are in data communication via a data interface 618. The display 612 preferably depicts each of the billing accounts associated with the accounting data 606. Upon interfacing with the document processing device 608, the data stored on the portable storage device 602 is displayed to an associated user via the display 612. User selection is then made via the user selection input 614 corresponding to one or more of the billing accounts. Thereafter, the switch 616 is suitably configured to initiate operation of the document processing device 608 in accordance with the user selection input 614, the identification data 604, and the accounting data 606.

Figure 7:
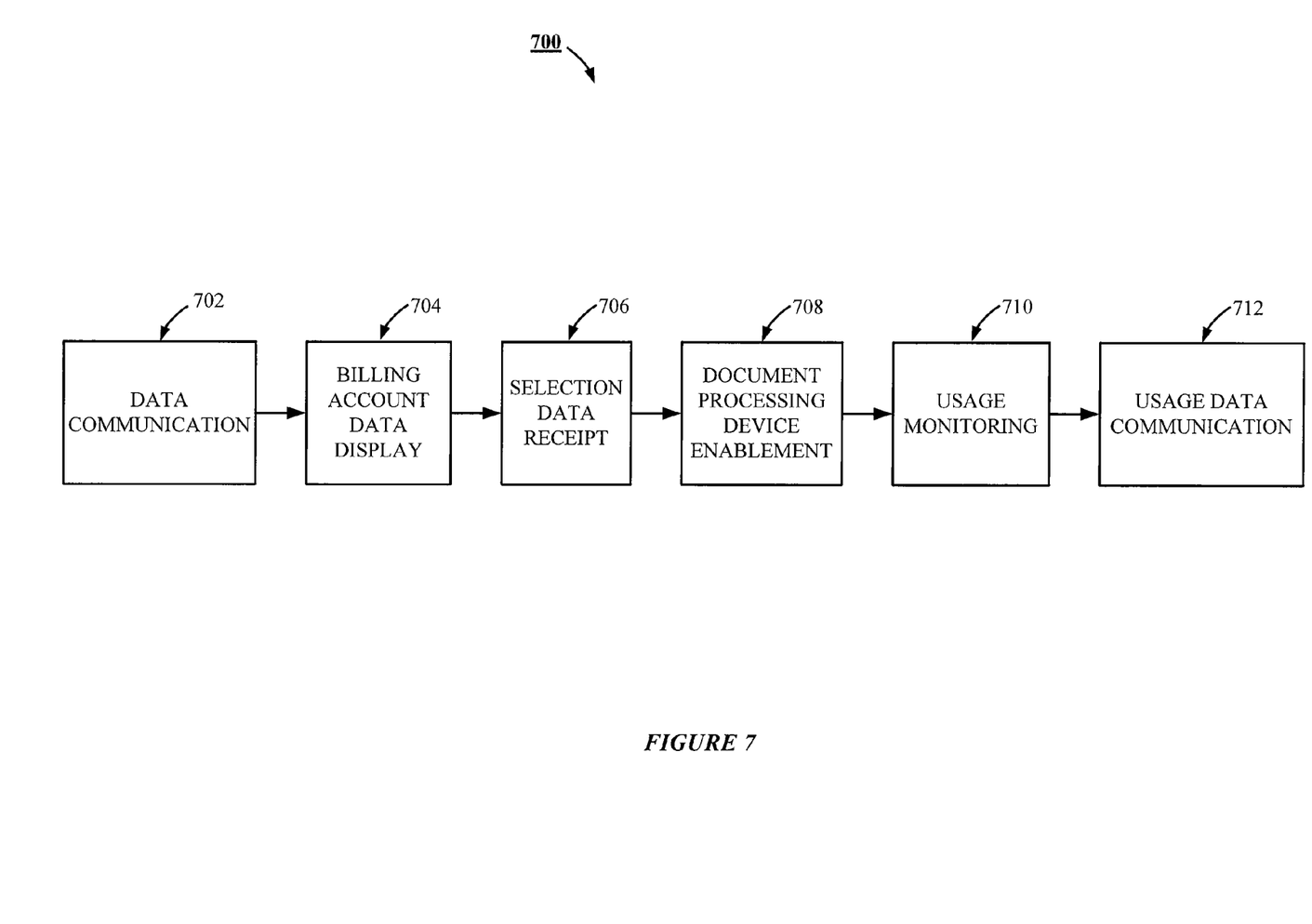
FIG. 7 is a functional diagram illustrating the document processing device usage and accounting system according to one embodiment of the subject application.

Referring now to FIG. 7, there is shown a functional diagram 700 illustrating the document processing device usage and accounting system in accordance with one embodiment of the subject application. As shown in FIG. 7, data communication 702 of identification and accounting data first occurs. Preferably, the identification data corresponds to an identity of a user associated with an associated portable storage device 122. In addition, the accounting data preferably corresponds to each of a plurality of billing accounts stored on the associated portable storage device.

Billing account data display 704 then occurs of the billing account data from the associated portable storage device 122 on the display 106 or 116 associated with the document processing device 104. Selection data receipt 706 of a selected billing account then occurs in accordance with a selection made by an associated user. Document processing device enablement 708 then occurs in accordance with the selection data and the identification data. Usage monitoring 710 is then performed of the document processing device 104 relative to the received selection data. Usage data communication 712 then occurs of the results of the usage monitoring 710 of the document processing device 104 with associated billing account data to the associated administrator 124.

Figure 8:
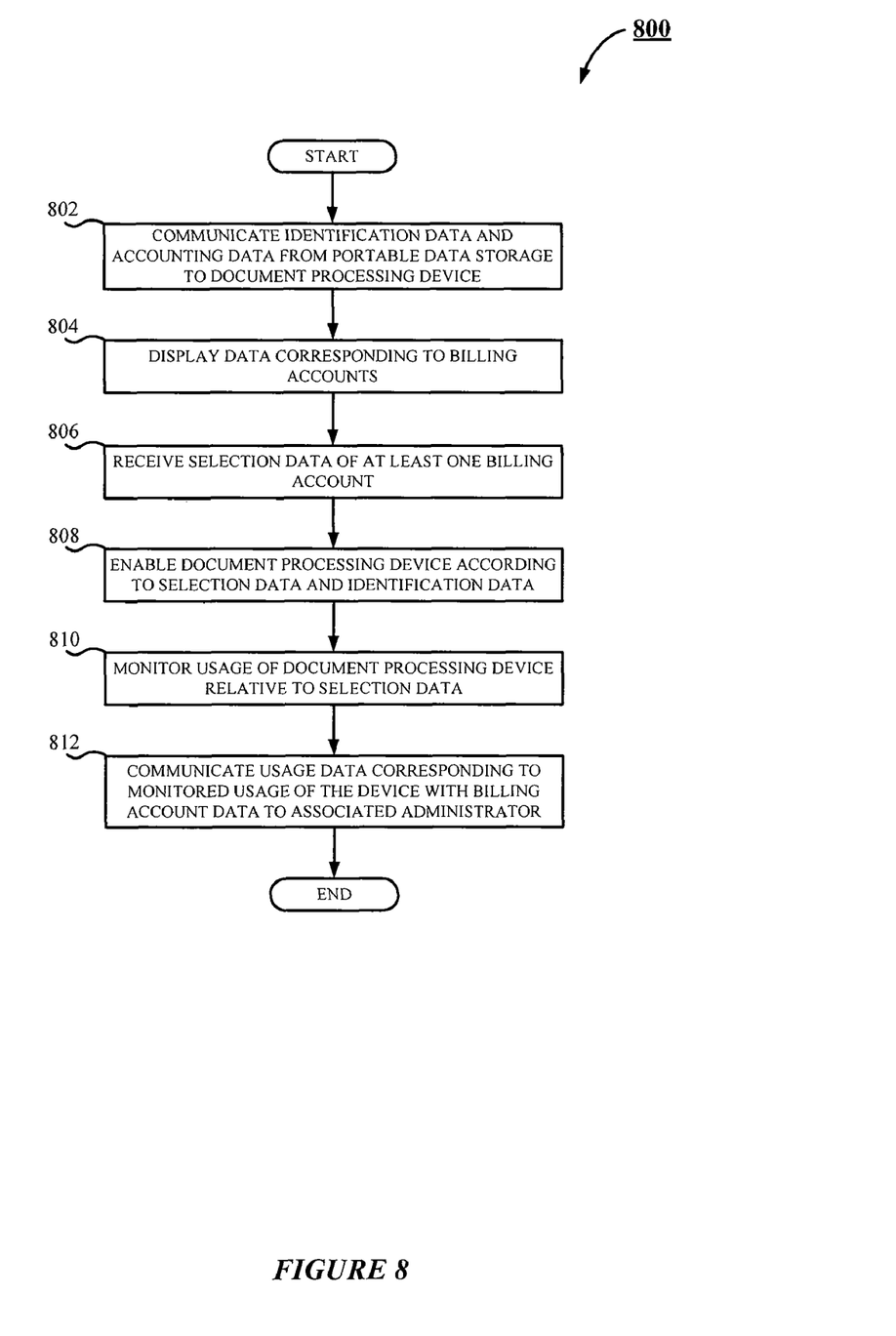
FIG. 8 is a flowchart illustrating a document processing device usage and accounting method for according to one embodiment of the subject application.

The skilled artisan will appreciate that the subject system 100 and components described above with respect to FIG. 1, FIG. 2, FIG. 3, FIG. 4, FIG. 5, FIG. 6, and FIG. 7 will be better understood in conjunction with the methodologies described hereinafter with respect to FIG. 8 and FIG. 9. Turning now to FIG. 8, there is shown a flowchart 800 illustrating a document processing device usage and accounting method in accordance with one embodiment of the subject application. Beginning at step 802, identification data corresponding to an identity of an associated user and accounting data corresponding to each of a plurality of billing accounts is communicated from a portable storage device 122 to the document processing device 104. In accordance with one embodiment of the subject application, the portable storage device 122 includes, for example and without limitation, a radio frequency identification device, a smart card, a magnetic card, a flash memory device, or the like.

At step 804, data corresponding to each of the billing accounts associated with the portable storage device 122 is displayed on the user interface 106, the kiosk 114, or other suitable component associated with the document processing device 104. Selection data is then received at step 806 corresponding to at least one of the displayed billing accounts displayed via the user interface 106 or kiosk 114 by an associated user; that is, an associated user selects one of the billing accounts to which document processing services are to be charged. At step 808, the document processing device 104 is enabled to perform document processing operations based upon the selection data and the identification communicated from the portable storage device 122.

The controller 108 or other suitable component associated with the document processing device 104 then monitors usage of the document processing device 104 relative to the received selection data at step 810. Stated another way, the controller 108 determines the resources used and document processing operation selected by the user corresponding to the billing account selected. At step 812, the usage data accumulated via the usage monitoring of the document processing device 104 is communicated to a suitable administrator, e.g. the administrative device 124.

Figure 9:
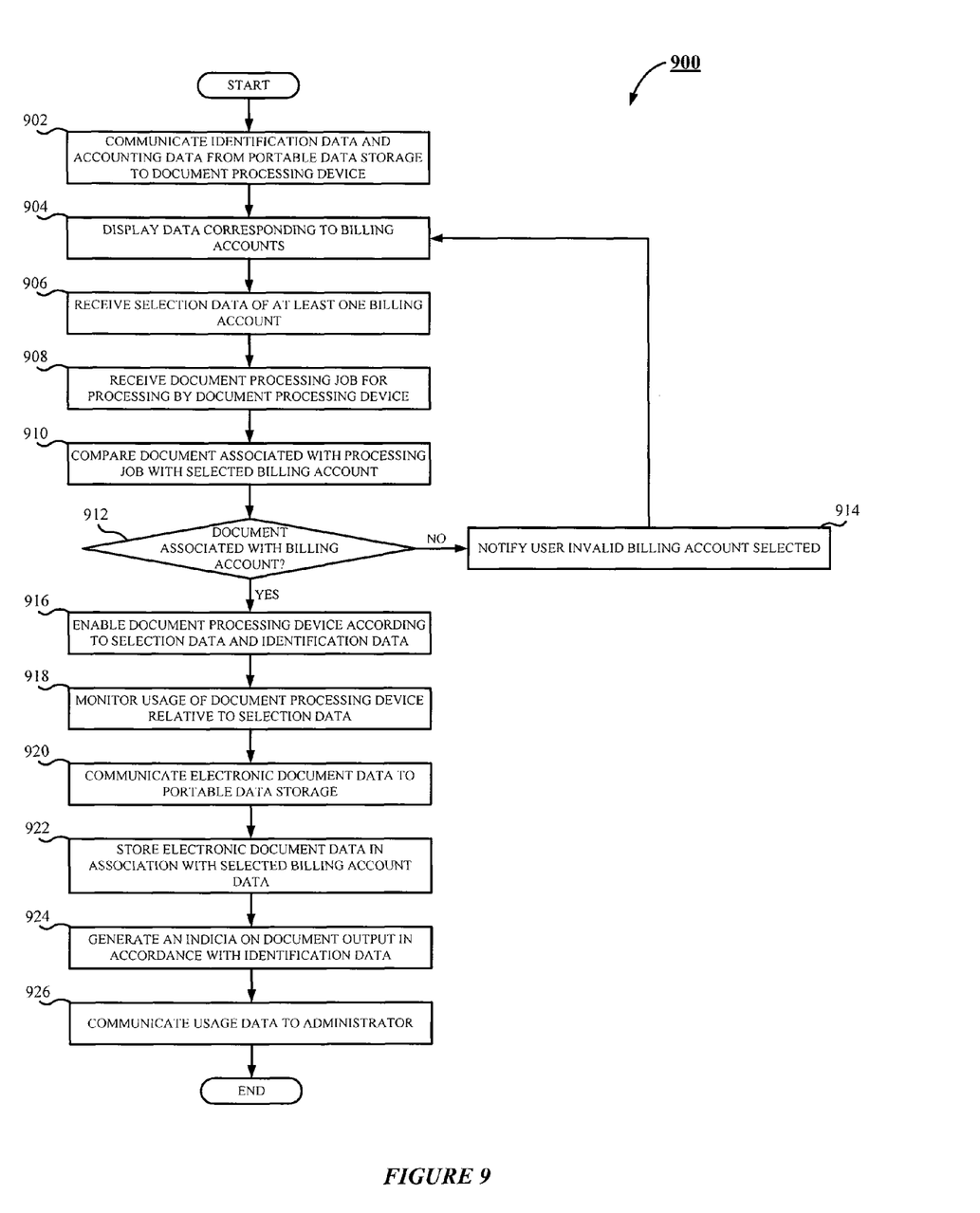
FIG. 9 is a flowchart illustrating a document processing device usage and accounting method for according to one embodiment of the subject application.

Referring now to FIG. 9, there is shown a flowchart 900 illustrating a document processing device usage and accounting method in accordance with one embodiment of the subject application. The methodology of FIG. 9 begins at step 902, whereupon identification data and accounting data are communicated from the portable storage device 122 to the controller 108 or other suitable component associated with the document processing device 104. It will be appreciated by those skilled in the art that such identification data is capable of including, for example and without limitation, login information of the user requesting document processing operation including username and/or password information or the like. In accordance with one embodiment of the subject application, the accounting data includes data corresponding to each of a plurality of billing accounts, e.g. clients, client matters, customers, customer account numbers, and the like. At step 904, the controller 108 or other suitable component associated with the document processing device 104 facilitates the display of billing account information on the user interface 106 or display 116 associated with the document processing device 104 communicated from the portable storage device 122.

Via the user interface 106 or kiosk 114 associated with the document processing device 104, selection data is received from the associated user at step 906 corresponding to at least one billing account from among those displayed to the user. At step 908, the controller 108 or other suitable component associated with the document processing device 104 receives a document processing job for processing by the document processing device 104. It will be appreciated by those skilled in the art that such a document processing job includes, for example and without limitation, document data, document processing operation type, finishing options, and the like. Suitable examples of such document processing operations include, for example and without limitation, copying, scanning, facsimile transmission, printing, electronic mail transmission, and the like.

At step 910, the controller 108 or other suitable component associated with the document processing device 104 compares the document processing job with the selected billing account data; that is, the controller 108 compares the selected billing account information, e.g. balance, client information, patient information, or the like, with the document for processing received in the document processing job. A determination is then made at step 912 as to whether the document associated with the job corresponds to the selected billing information. When it is determined that the document does not correspond to the selected billing information, flow proceeds to step 914. At step 914, the user is notified via any suitable means known in the art that an invalid billing account has been selected, whereupon operations return to step 904. For example, when the document is associated with a different client or patient, the document processing operation is not allowed for the selected document, insufficient funds exist on the billing account, the user identification data indicates the user is not authorized to access the document, or the like, the user is notified of the invalid account selection and is prompted to select the correct billing account.

Upon a determination at step 912 that the document associated with the document processing job corresponds to the selected billing information, operations progress to step 916. At step 916 the document processing device 104 is enabled to perform the desired document processing operation in accordance with the selected billing information and the user identification data. For example, the document processing device 104 commences output of the document processing job, e.g. prints an associated document, transmits a facsimile of an associated electronic document, or the like. At step 918, the controller 108 or other suitable component associated with the document processing device 104 monitors the usage of the device 104 with respect to the document processing job; that is, the controller 108 monitors how much time the user spends processing the job, the requested operation type, the amount of resources used, long distance charges, toner selections, etc. At step 920, electronic document data corresponding to operation of the document processing device 104 is communicated to the portable data storage 122. The communicated electronic document data is then stored associatively with the selected billing account, i.e. the billing account corresponding to the received selection data, on the portable data storage 122 at step 922.

Indicia is then generated on the document output of the document processing device 104 corresponding to the identification data received from the portable data storage 122 at step 924. Stated another way, an unique identification is affixed to the processed document produced by the document processing device 104 corresponding to the document processing operation performed, the user requesting the operation, the billing account to which the operation corresponds, or the like. In accordance with one embodiment of the subject application, the indicia include, for example and without limitation, a sequence number associated with a plurality of document processing operations. At step 926, the usage data is communicated from the document processing device 104 to the administrative device 124 via the computer network 102. According to one embodiment of the subject application, the usage data includes the selected billing account information and is used by the administrative device 124 to track, monitor, and bill the operation to the designated billing account.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally, and equitably entitled.

What is claimed:

1. A document processing device usage and accounting system, comprising:
   a portable data storage including user identification data and accounting data corresponding to each of a plurality of billing accounts;
   a document processing device, independently capable of a plurality of document processing operations including printing, copying, and facsimile;
   a fixed data storage disposed on the document processing device;
   a data interface between the portable data storage and the fixed data storage;
   a display associated with the document processing device, the display to present information corresponding to each of the billing accounts;

a user selection input for receiving input of a selected billing account from user interaction with the display; and a switch to enable a document processing operation of the document processing device with billing for the document processing operation directed to a selected billing account in response to receipt of the user selection input, the identification data, and the accounting data.

2. The system of claim 1, wherein the data interface is wireless.

3. The system of claim 2, wherein the portable data storage is comprised of at least one of the group consisting of an RFID, a smart card, and an employee badge.

4. The system of claim 3, wherein the document processing device includes a usage meter.

5. The system of claim 4, wherein the document processing device includes an output port for usage data from the usage meter in accordance with the accounting data.

6. The system of claim 1, further comprising a sequence number generator operable in accordance with the identification data.

7. A document processing device usage and accounting method, comprising:
   receiving identification data including an identity of user and accounting data for each of a plurality of billing accounts from a portable data storage;
   displaying the accounting data including each of the plurality of billing accounts on a display of a document processing device independently capable of a plurality of document processing operations including printing, copying, facsimile and email;
   receiving selection data via a user interface of the document processing device, the selection data identifying at least one billing account selected from the plurality of billing accounts;
   enabling a document processing operation of the document processing device with billing for the operation directed to the at least one billing account identified by the selection data and identification data;
   monitoring the document processing device in response to receipt of the selection data to thereby generate usage data for the document processing operation; and
   communicating the usage data and the at least one billing account to an administrator.

8. The method of claim 7, further comprising communicating electronic document data for use in the to portable data storage for storage with the at least one billing account.

9. The method of claim 7, further comprising generating an indicia on a document output resulting from the operation, the document output including the identification data.

10. The method of claim 9, wherein the document output includes the identity of the user on at least one of a print output, a scan output, and a facsimile output.

11. The method of claim 9, wherein the indicia includes a sequence number associated with a plurality of document processing operations.

12. A document processing device usage and accounting system, comprising:
   means for receiving identification data including an identity of user and accounting data for each of a plurality of billing accounts from a portable data storage;
   display means for displaying the accounting data including each of the plurality of billing accounts on a document processing device independently capable of a plurality of document processing operations including printing, copying, facsimile and email;
   means for receiving selection data via a user interface of the document processing device, the selection data identifying at least one billing account selected from the plurality of billing accounts;
   means for enabling a document processing operation of the document processing device with billing for the operation directed to the at least one billing account identified by the selection data and identification data;
   means for monitoring the document processing device in response to receipt of the selection data to thereby generate usage data for the document processing operation; and
   means for communicating the usage data and the at least one billing account to an administrator.

13. The system of claim 12, further comprising means for communicating electronic document data for use in the operation to the portable data storage for storage with the at least one billing account.

14. The system of claim 12, further comprising means for generating an indicia on a document output resulting from the operation, the document output including the identification data.

15. The system of claim 14, wherein the document output includes the identity of the user on at least one of a print output, a scan output, and a facsimile output.

16. The system of claim 14, wherein the indicia includes a sequence number associated with a plurality of document processing operations.

* * * * *